May 7, 1935.  E. G. HILL  2,000,331

MOTOR VEHICLE CLUTCH CONTROL MECHANISM

Filed Feb. 3, 1934  2 Sheets-Sheet 1

Inventor
EDWARD G. HILL

Patented May 7, 1935

2,000,331

UNITED STATES PATENT OFFICE 2,000,331

MOTOR VEHICLE CLUTCH CONTROL MECHANISM

Edward G. Hill, Richmond, Va., assignor to Hill Engineering Corporation, Richmond, Va., a corporation of Virginia Application February 3, 1934, Serial No. 709,650

19 Claims. (Cl. 192—.01)

This invention relates to motor vehicle clutch control mechanisms and is an improvement over the mechanism described and claimed in my copending application Serial No. 704,563, filed December 29, 1933.

In my copending application referred to, I have disclosed an automatic clutch control mechanism wherein the vacuum of the intake manifold of the vehicle engine is utilized as the source of differential pressure for disengaging the clutch. A novel form of control valve mechanism is employed for controlling the return movement of the clutch elements into operative engagement in accordance with varying conditions. The control valve mechanism is operative for disengaging the clutch without transmitting any drag to the vehicle due to the deceleration of the motor when the accelerator pedal is released, and reengagement of the clutch takes place under practically all conditions without transmitting any jerk to the vehicle due to the operation of the control mechanism in governing clutch reengagement in accordance with the conditions under which the accelerator pedal is depressed.

Assuming that the vehicle is at a standstill with the gear shift lever in low gear position, the accelerator normally will be depressed relatively slowly, under which conditions the control mechanism referred to functions to release the clutch elements for relatively rapid movement substantially to the point of initial engagement of the clutch elements and checks the movement of the clutch elements at such point. Thereafter the continued depression of the accelerator pedal operates the control mechanism to release the clutch elements for complete engagement at a rate dependent upon the rate of operation of the accelerator. A similar operation takes place in releasing the clutch after the gear shift lever has been placed in intermediate gear except that the checking of the clutch elements takes place very slightly later, as is desirable, for the reasons disclosed in the copending application referred to. When the vehicle is in high gear after having gained substantial vehicle speed in second gear, the accelerator may be operated more rapidly to accelerate the engine more rapidly, under which conditions the checking of the movement of the clutch elements takes place slightly later than when the vehicle is in second gear.

The proper reengagement of the clutch elements takes place with the apparatus referred to under all reasonable conditions of accelerator operation, and the apparatus is provided with auxiliary valve means operative for preventing the too rapid engagement of the clutch elements when the accelerator is depressed unreasonably rapidly, the sudden increase in pressure of the intake manifold incident to the unreasonably rapid operation of the accelerator being utilized to effect the operation of the auxiliary valve.

From the disclosure of the copending application referred to, therefore, it will be apparent that the apparatus functions to provide remarkably smooth clutch engagement for gear shifting purposes, and operates under all conditions when the accelerator is released to effect declutching without transmitting any drag to the vehicle. It also will be apparent that the unreasonably rapid operation of the accelerator prevents the too sudden reengagement of the clutch elements. The highly advantageous features of operation of the mechanism, therefore, render it particularly desirable for use as a free wheeling unit. In this connection, it is noted that many motor vehicles are equipped with overruning clutches to permit the vehicle to coast when the vehicle is in high gear and the accelerator is released. Prior types of clutch control mechanisms are not satisfactory as substitutes for the overrunning clutches or "free wheeling" devices referred to although their use for such purposes is preferable over standard "free wheeling" devices for the reason that they are cheaper to manufacture and because they provide the additional advantage of permitting gear shifting to any gear without operation of the clutch pedal.

Such prior clutch operating mechanisms, however, do not provide the desired "free wheeling" operation for two reasons. In the first place, they do not effect prompt declutching upon the releasing of the accelerator pedal, and any attempt to utilize such devices for "free wheeling" results in the transmission of a sudden drag to the vehicle at each releasing of the accelerator pedal. In the second place, reengagement of the clutch elements causes a jerking of the vehicle due to the fact that engine speeds are not increased at the proper rate in proportion to clutch reengagement when an operator depresses the accelerator to effect reengagement of the clutch while the vehicle is under substantial headway.

It has been found that the features of operation of the device disclosed in my copending application are such as to render the device desirable for use as a "free wheeling" unit since no dragging is transmitted to the vehicle when the accelerator is released, and the device functions under most conditions to effect clutch reengagement in a proper manner with respect to engine operation when the accelerator is depressed. However, there is one range of movement of the accelerator pedal during which clutch reengagement does not take place as accurately as is desired, although the jerking transmitted to the vehicle during such range of movement of the accelerator pedal is slight and not seriously objectionable.

Assuming that a vehicle is traveling in high gear at a substantial rate of speed, for example, at sixty miles per hour, and the accelerator pedal is released to permit "free wheeling", it will be apparent that when the clutch is reengaged it is necessary for the engine speed to be accelerated from the idling speed to a speed corresponding to that of the vehicle within a very short interval of time. The time required for the engine to accelerate to the vehicle speed depends, of course, on the speed at which the vehicle is traveling, and obviously the higher the vehicle speed the longer will be the interval of time required for the engine to accelerate to a point corresponding to the vehicle speed.

With the apparatus disclosed in my copending application, clutch operation takes place perfectly for gear shifting purposes for the reason that even with present day types of motor vehicles, gear shifting rarely takes place when the vehicle is traveling at high speeds. Throughout the range of movement of the accelerator of the vehicle during gear shifting operations, the control valve mechanism of my copending application operates to provide smooth clutch engagement without the operation of the auxiliary valve referred to, such valve coming into operation automatically only when the throttle is opened unreasonably suddenly. When the device is used as a free wheeling unit, it has been found that the engine acceleration takes place properly in relation to clutch reengagement during that portion of the range of movement of the throttle during which gear shifting normally takes place, and even beyond such range of movement. It also has been found that the proper relationship between clutch reengagement and engine acceleration exists if the throttle is opened rapidly substantially beyond the range of movement just referred to, and this proper operation takes place through the automatic operation of the auxiliary valve which acts to retard clutch reengagement when the vacuum of the intake manifold is reduced below a predetermined point incident to the sudden and substantial opening of the throttle.

If a vehicle is traveling at high rates of speed, for example, from sixty to eighty miles per hour or more and free wheeling takes place through the releasing of the accelerator, reengagement of the clutch naturally will take place through the depression of the accelerator pedal and the operator will open the throttle rapidly substantially to the point corresponding to vehicle speed, and under such conditions, the auxiliary valve will function to retard clutch engagement, thus affording a sufficient time interval for the engine speed to increase to a point corresponding to vehicle speed. Thus it will be apparent that the clutch operating mechanism of my copending application functions to provide perfectly smooth clutch reengagement after free wheeling during two ranges of accelerator operation. For the purpose of illustration, it may be said that such proper operation takes place during the two ranges of throttle movement corresponding to vehicle speeds of from zero to approximately forty miles per hour and upwardly from sixty miles per hour. These figures are not intended to be accurate since the ranges of operation referred to will vary with different vehicles, and are intended only to be illustrative.

During the remaining range of operation of the accelerator, that is, in the range corresponding to vehicle speeds of from forty to sixty miles per hour, the control valve mechanism functions to provide clutch reengagement approximately but not accurately proportionate to engine acceleration, and during the range of movement referred to the auxiliary valve does not come into operation to retard positive engagement of the clutch elements. During the intermediate range of operation of the throttle when returning to normal operation after free wheeling, therefore, the acceleration of the vehicle engine does not take place quite rapidly enough to permit an engine speed corresponding to vehicle speed to be reached by the time final engagement of the clutch elements takes place. Accordingly a slight jerking of the vehicle occurs during the intermediate range of movement of the accelerator when returning to normal operation after free wheeling, although the jerking action is not serious or particularly objectionable. During the ranges of movement above and below the intermediate range referred to, however, the device functions perfectly as a free wheeling unit in addition to providing accurately operating means to permit gear shifting by operating the clutch pedal.

An important object of the present invention is to improve the prior construction previously discussed by adding thereto a simple control device functioning during the intermediate range of movement referred to to retard clutch engagement to afford an opportunity for the motor speed to accelerate to a point corresponding to vehicle speed before final positive clutch engagement takes place.

A further object is to provide a supplemental valve which is inoperative throughout the ranges of movement of the accelerator pedal during which proper clutch reengagement takes place after free wheeling, and which is rendered automatically operative during the intermediate range referred to to retard clutch reengagement for the purpose stated.

A further object is to provide an automatic clutch control mechanism which operates smoothly and effectively as means for permitting gear shifting without use of the clutch pedal and which provides an efficient free wheeling action by releasing the clutch promptly upon the releasing of the accelerator, without transmitting any engine drag to the vehicle, and which provides for smooth reengagement of the clutch elements without the jerking of the vehicle by permitting engine speeds to accelerate to the proper point before positive clutch engagement takes place.

Other objects and advantages of the invention will become apparent during the course of the following description.

In the drawings I have shown one embodiment of the invention. In this showing:

Figure 3 is a transverse sectional view on line 3—3 of Figure 2, Figure 5 is a detail section on line 5—5 of Figure 3, and, Figure 6 is a diagrammatic representation of an electrical system particularly adapted for use in connection with the apparatus.

Figures 1, 2, 4:
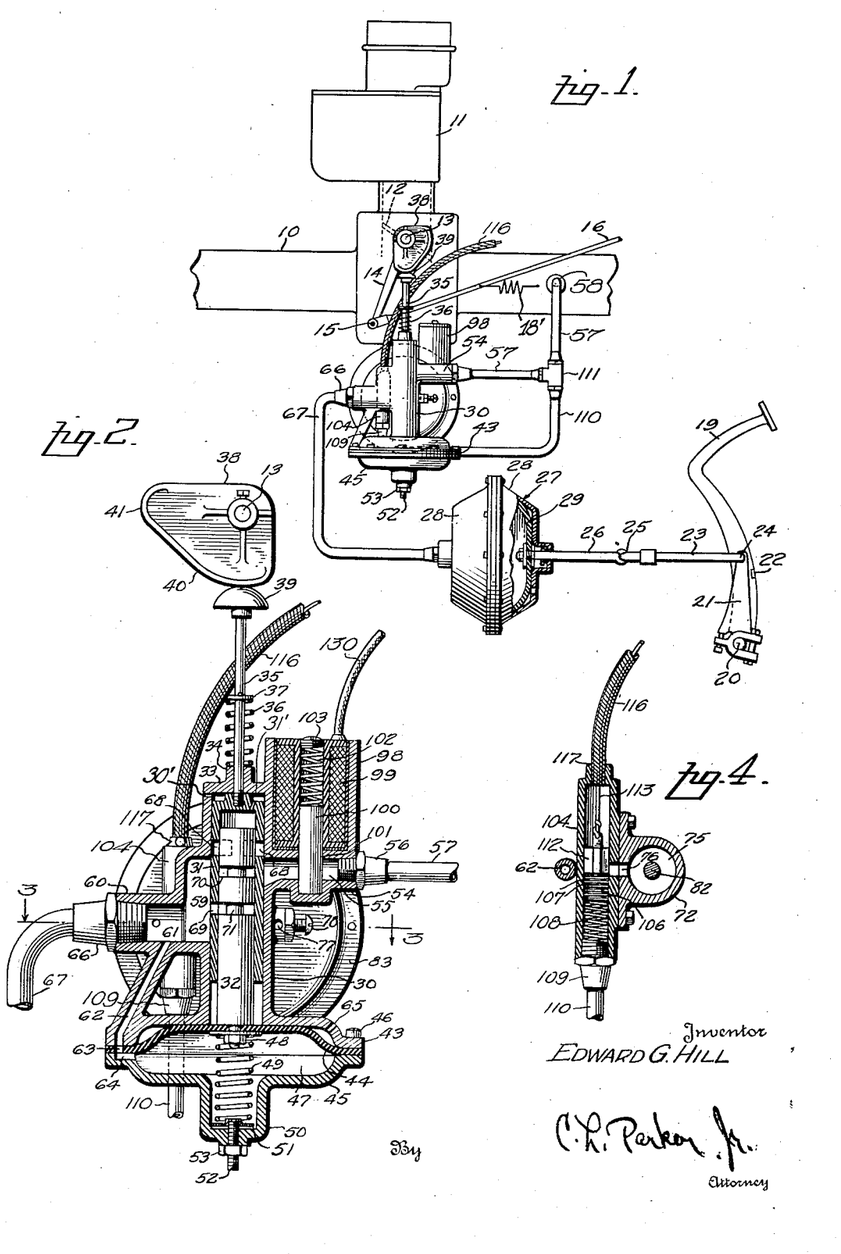
Figure 1 is a side elevation of the apparatus shown in position with respect to certain parts of the motor vehicle engine and associated elements, parts being broken away.
Figure 2 is a central vertical sectional view through the main valve cylinder looking in the same direction as Figure 1, parts being shown in elevation.
Figure 4 is a detail section on line 4—4 of Figure 3.

Referring to Figure 1, the numeral 10 designates the intake manifold of a motor vehicle engine to which is connected a carbureter 11, shown in the present instance as being of the down-draft type. The carbureter is provided with the usual throttle valve 12 mounted on a shaft 13, and an arm 14 is connected to this shaft to operate the throttle. The arm 14 is pivotally connected at its lower end as at 15 to an accelerator rod 16. This rod is operated conventionally, as will be apparent, and in Figure 5 of the drawings the rod 16 is illustrated as being provided at its rear end with a button 17 against which an accelerator pedal 18 operates, and a return spring 18' is connected to the rod 16 to tend to move the throttle valve 12 to closed or idling position.

Figures 3, 5, 6:
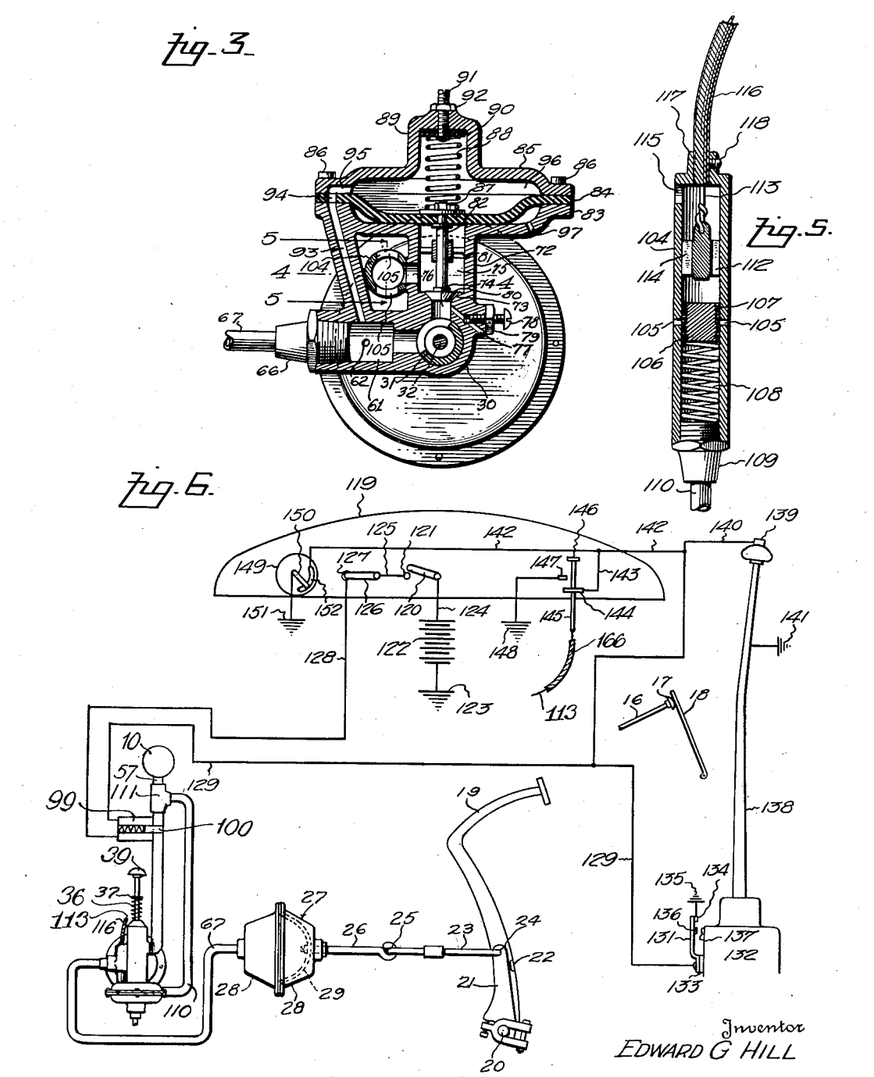

Referring to Figures 1 and 6, the numeral 19 designates a conventional clutch pedal freely mounted on the clutch shaft 20. An arm 21 is fixed in any suitable manner to the clutch shaft to operate the latter, and the pedal 19 is provided with a suitable lug 22 engageable against the upper end of the arm 21 in order to transmit movement from the pedal 19 to the arm 21 when the pedal is operated conventionally. A cable or similar element 23 is connected to the arm 21 as at 24 and the forward end of the cable is connected as at 25 to the rear end of a reciprocating rod 26 forming a part of a power device indicated as a whole by the numeral 27. The power device may be of any suitable type and is preferably of the type disclosed in the prior patent and copending application referred to. Such a power device includes casing sections 28 between which is clamped the peripheral portion of a diaphragm 29 operable by differential pressure and connected to the rod 26.

The principal elements of the valve mechanism are illustrated in Figures 2 and 3 of the drawings. Referring to Figure 2, the numeral 30 designates a valve cylinder in which is reciprocable a sleeve valve 31. A piston valve 32 is mounted to slide within the valve 31. The upper ends of the cylinder 30 and sleeve valve 31 are provided with atmospheric ports 30' and 31', respectively, to prevent the building up of pressure which would tend to retard upward movement of the valves 31 and 32. The upper end of the valve cylinder 30 is closed by a head 33 and a bearing 34 is formed integral with the head 33 to slidably support a valve stem 35. A light spring 36 surrounds the stem 35. This spring has its lower end seating against the bearing 34 and its upper end engaging a washer 37 or similar device surrounding and fixed against upward movement with respect to the stem 35.

The stem 35 provides means for reciprocating the sleeve valve 31, and it will become apparent that any desired means associated with the throttle or accelerator may be employed for this purpose. The means illustrated, however, forms the most practicable operating means for the sleeve valve 31, and the stem 35 is preferably arranged vertically as shown in Figure 2 in order that it may be directly operated in conjunction with the accelerator and throttle. As shown, a cam 38 is preferably employed for operating the stem 35. This cam may be mounted on the throttle shaft 13 and has its edge in engagement with a head 39 secured to the upper end of the stem 35. The cam 38 is shown in Figure 2 in a position in which the throttle is in substantially open position, and accordingly the sleeve valve 31 is at its upper limit of movement. Under such conditions, the head 39 engages the low segment of the cam. The throttle is closed by rotating the shaft 13 in a counter-clockwise direction as viewed in Figures 1 and 2, and accordingly the height of the cam increases from the point 40 to the point 41. The point 41 contacts with the head 39 when the throttle is in idling position at which time the sleeve valve 31 will be moved downwardly to its lowermost position, for a purpose to be described.

The throw of the cam decreases from the point 41 to the point 40, during which time the throttle is opened to a predetermined extent, for example, to a half open throttle position. Beyond the point 40, the edge of the cam is concentric with the axis of the shaft 13 throughout the remainder of the range of throttle movement. Accordingly, movement of the throttle does not affect the valve 31 while the head 39 contacts with the concentric portion of the cam, but movement of the throttle toward closed or idling position progressively moves the valve 31 downwardly, while the cam moves over the head 39 between the points 40 and 41. Conversely, opening movement of the throttle progressively releases the valve 31 for upward movement as the cam travels over the head 39 between the points 41 and 40.

The lower end of the valve cylinder 30 is enlarged to provide an annular flange 43 and a diaphragm 44 has the upper face of its peripheral portion engaging the outer portion of the flange 43. A cap 45, similar in diameter to the flange 43 and diaphragm 44, is seated against the latter, and screws 46 or other suitable fastening elements secure the cap 45 in position with respect to the flange 43. The diaphragm 44 and cap 45 form a vacuum chamber 47 for a purpose to be described. The lower end of the valve 32 is secured to the diaphragm 44 by a nut 48, and a spring 49 urges the diaphragm and valve 32 upwardly. The lower end of the spring 49 projects into an axial extension 50 carried by the cap 45 and engages against a spring seat 51. A screw 52 is provided for vertically adjusting the cap 51 to adjust the tension of the spring 49, and a lock nut 53 secures the screw 52 in adjusted positions.

The valve cylinder 30 is provided with a lateral extension 54 in which is formed a passage 55. This passage forms a port which communicates at its inner end with the interior of the valve cylinder 30 and a union 56 is tapped into the outer end of the passage 55. A conduit 57 is connected at one end to the union 56 and has its opposite end connected to the intake manifold 10 as at 58.

A vacuum chamber 59 extends along a portion of the valve cylinder 30 and is formed integral therewith. This chamber preferably is arranged diametrically opposite the port or passage 55 and has its upper extremity in transverse alinement therewith. The valve cylinder 30 is provided with an integral projecting portion 60 forming a vacuum passage 61 communicating at its inner end with the chamber 59. An integral passage 62 communicates at its upper end with the passage 61 and has its lower end extending through the flange 43. The lower end of the passage 62 communicates with an opening 63 formed in the adjacent peripheral portion of the diaphragm 44, and this opening, in turn, communicates with the vacuum chamber 47 through a port 64 formed in the cap 45. Accordingly it will be apparent that the communication of the chamber 47 with the passage 61 causes the diaphragm 44 to be influenced by differential pressure in the passage 61, and the flange 43 is provided with an atmospheric port 65 in order that the upper face of the diaphragm 44 may be always subject to atmospheric pressure. A union 66 is tapped into the outer end of the passage 61, and a conduit 67 is connected between the union 66 and the power device 27, as shown in Figure 1.

The sleeve valve 31 is provided with opposite circumferentially elongated ports 68 adapted for communication respectively with the port 55 and the upper end of the chamber 59. The sleeve valve 31 is further provided with a circumferentially elongated port 69 communicating with the chamber 59. The valve 32 is provided with circumferential grooves 70 and 71 forming ports adapted for communication respectively with the ports 68 and 69. When the valves are in the position shown with the engine throttle substantially open, the ports 69 and 71 afford communication between the chamber 59 and the atmosphere, in a manner to be described, while the ports 68 and 70 are substantially out of registration to disconnect the chamber 59 from the intake manifold. For the proper operation of the device, it will be noted that the remote extremities of the ports 70 and 71 are spaced apart a distance at least equal to the inner or adjacent extremities of the ports 68 and 69.

An integral cylindrical extension 72 extends laterally from the valve cylinder 30, and a valve seat 73 divides the extension 72 into chambers 74 and 75. The chamber 75 is in communication with the atmosphere through a port 76 of substantial size, and through other means to be later referred to in detail. The chamber 74 is in restricted constant communication with the atmosphere through a port 77, and the effective area of this port is adapted to be adjusted by a screw 78 provided with a lock nut 79 for securing it in adjusted positions. A valve 80 normally engages the seat 73 to close communication between the chambers 74 and 75 and the interior of the extension 72 may be provided with a guide 81 in which the stem 82 of the valve 80 is reciprocable.

The extension 72 is provided with an enlarged annular flange 83 against which a diaphragm 84 is seated, and a cap 85 is arranged against the diaphragm 84 and secured to the flange 83 by suitable screws 86. The valve stem 82 has its end secured to the diaphragm 84 as at 87 and a spring 88 urges the diaphragm radially inwardly toward the axis of the valve cylinder 30, thus tending to move the valve 80 toward its seat. The cap 85 is provided with an axial extension 89 into which the spring 88 projects, and the spring engages a spring seat 90. The spring seat is adjustable by a screw 91 to vary the effective tension of the spring 88, and a lock nut 92 secures the screw 91 in adjusted positions. An integral passage 93 communicates at one end with the passage 61 and at its other end with an opening 94 formed in the peripheral portion of the diaphragm 84. The cap 89 is provided with a port 95 communicating between the opening 94 and the chamber 96 formed between the cap 85 and diaphragm 84. Thus it will be apparent that the chamber 96 is influenced by vacuum in the passage 61, and the cap 83 is provided with an atmospheric port 97 in order that the diaphragm 84 may have its adjacent face subject to atmospheric pressure at all times. In this connection, it will be noted that both of the diaphragm chambers 47 and 96 are influenced by vacuum in the passage 61, but the spring 88 is substantially lighter than the spring 49.

A cylindrical pocket 98 is formed integral with the valve cylinder 30 adjacent one end thereof and receives a solenoid 99. The solenoid is provided with an armature 100 forming a valve operative through an opening 101 formed in the extension 54, to form a closure for the port 55. A spring 102 normally urges the valve 100 toward closed position, and the upper end of the spring seats against a cap 103 arranged in the upper end of the solenoid 99.

The elements described correspond to the elements disclosed in my pending application Serial No. 704,563, previously referred to, and such structure has been found to operate with remarkable smoothness as a clutch control for gear shifting purposes. The apparatus also has been found to operate with a remarkable degree of smoothness as a free wheeling unit for disengaging and automatically reengaging the clutch when the vehicle is traveling in high gear except during the intermediate range previously described. During such latter speed range the apparatus causes only a slight and almost negligible jerking of the vehicle, and thus is a substantial improvement over prior clutch control devices when used as a free wheeling unit. I have found, however, that even the very slight jerking occurring in the intermediate range referred to can be eliminated by the provision of a supplemental control valve governing the admission of air into the chamber 75 under certain conditions.

Referring to Figures 3, 4 and 5, the numeral 104 designates a supplemental valve cylinder secured to the extension 72 and having its interior communicating with the interior of the chamber 75 through the port 76. The cylinder 104 is provided with atmospheric ports 105 at opposite sides thereof as shown in Figure 3. These ports are relatively narrow as shown in Figure 5, but the ports referred to are of substantial length and their combined area is at least as great as the area of the port 76. In the absence of a restricting valve to be referred to, therefore, the ports 105 do not restrict the flow of air into the chamber 25 through the port 76.

The valve cylinder 104 is relatively long, as shown in Figures 4 and 5, and a floating valve 106 is reciprocable therein. The valve 106 is provided with a plurality of relatively narrow annular grooves 107, and when the valve 106 is in an intermediate position, as shown in Figure 5, the grooves 107 restrict the flow of air between the ports 105 and 76. A light spring 108 urges the valve 106 upwardly. The tension of this spring is adapted to be overcome by differential pressure acting on opposite sides of the valve 106. The lower end of the valve cylinder 104 is connected by a union 109 to one end of a conduit 110. The conduit 57, previously described, is provided intermediate its ends with a T 111 and the conduit 110 is connected to this T as indicated in Figure 1. Accordingly it will be apparent that the interior of the valve cylinder 104 beneath the valve 106 is influenced by variations in pressure in the intake manifold of the engine.

The valve 106 is intended to be used only when the apparatus is utilized as a free wheeling unit, and its use is not necessary or desirable when the apparatus is used as a clutch control for gear shifting purposes. Accordingly means are provided for rendering the valve 106 inoperative regardless of the partial vacuum existing therebelow. As shown in Figure 5, a plunger 112 is vertically movable in the upper end of the valve cylinder 104 and is connected to a Bowdin wire 113. The plunger 112 includes cut out portions 114 extending throughout its length and accordingly the portions of the valve cylinder 104 on opposite sides of the plunger 112 are in communication with each other. This construction is provided in order that the valve 106 may be influenced by differential pressure at opposite ends thereof, and the upper end of the valve cylinder 104 is provided with an atmospheric port 115.

The Bowdin wire 113 is slidable in a suitable flexible sleeve 116. This sleeve projects through an axial boss 117 formed at the upper end of the cylinder 104 and is held in position by a set screw 118. It will be apparent that the Bowdin wire is merely one convenient way of operating the plunger 112 and any other suitable means may be employed for this purpose.

In Figure 6 of the drawings an electrical system for use in connection with the apparatus is disclosed, and this system is substantially identical with the system disclosed in my copending application Serial No. 704,563, previously referred to, except that the means for operating the free wheeling switch is connected to the valve 106 to operate the latter simultaneously with the free wheeling switch. The electrical system disclosed, therefore, is selectively operable to permit automatic free wheeling under all conditions when the accelerator pedal is released; it is operative for permitting conventional clutch operation; and it is operative for effecting free wheeling whenever the accelerator pedal is released in all gears and under all conditions except when the vehicle is traveling below a predetermined speed in high gear. Under the latter operating conditions, the vehicle engine is permitted to act as a brake when the accelerator is released and the vehicle is traveling above such predetermined speed.

Referring to Figure 6, the numeral 119 designates the instrument panel of the vehicle and the ignition switch for the engine as indicated by the numeral 120 is arranged on the instrument panel and movable into engagement with a stationary contact 121. The vehicle battery 122 has one side grounded as at 123 and the other side of the battery is connected to the ignition switch by a wire 124. A wire 125 connects the contact 121 to a main control switch 126 normally in engagement with a contact 127. This contact is connected by a wire 128 to one terminal of the solenoid 99. A wire 129 is connected to the other terminal of the solenoid, and the two wires 128 and 129 may be arranged in a cable 130, as indicated in Figure 2. In this connection it will be noted that the valve 100, operated by the solenoid 99, has been illustrated diagrammatically in Figure 6 as being associated with the conduit 57 in which case it functions in identically the same manner as the embodment of the valve 100, the passage 55 and pipe 57 forming, in effect, parts of the same conduit.

The wire 129 leads to a switch 131 supported with respect to the vehicle gear set 132 by suitable insulation 133. The switch 131 is normally biased into engagement with a stationary contact 134 and this contact is grounded as at 135. The switch 131 carries an insulating member 136 engageable by the second and high gear shift rod 137 of the gear set. It will be apparent that this shift rod moves forwardly when the vehicle is in high gear to engage the insulation 136 and thus move the switch arm 131 to break the connection between this switch arm and the contact 134. These elements remain in contact with each other, however, when the gear set is in any position other than high gear.

The gear set 132 is provided with the usual gear shift lever 138 and a button switch 139 is arranged at the upper end of this lever. A wire 140 connects the switch button 139 to the wire 129. The gear shift lever is grounded as indicated by the numeral 141. It will become apparent that a circuit through the solenoid 99 may be completed independently of the switch 131 by depressing the button 139.

A wire 142 is connected at one end to the wire 140 and has a branch 143 leading to a free wheeling switch 144. This switch is illustrated diagrammatically as being connected to a vertically movable stem 145 which is connected, in turn, to the Bowdin wire 113 and provided at its upper end with a button 146. The switch 144 is movable into engagement with a contact 147 which is grounded as at 148. It will become apparent that when the button 146 is moved vertically from the position shown in Figure 6, the circuit through the solenoid 99 will be completed regardless of the position of the gear set switch 131, and the plunger 112 will be simultaneously moved upwardly to the position shown in Figure 5 to release the free wheeling valve 106.

A speedometer indicated as a whole by the numeral 149 is mounted on the instrument panel and is provided with an indicating finger and dial (not shown) of any conventional type. A switch 150 is associated with the mechanism of the speedometer and moves with the indicating finger. The switch 150 is grounded as indicated at 151. An arcuate contact 152 is engageable by the switch 150 throughout a portion of the range of movement of the indicating finger of the speedometer starting from zero speed, and the contact 152 is connected to the wire 142. The switch 150 engages the contact 152 when the vehicle is at rest and leaves the contact when the vehicle speed reaches a predetermined point, for example, at a speed of approximately eight miles per hour.

The operation of the apparatus is as follows:

It will be apparent that the connection of the power device 27 to the intake manifold is initially dependent upon the position of the solenoid valve 100, since the closing of the latter renders the valves 31 and 32 inoperative for controlling communication between the power device and the intake manifold. It will become apparent that the solenoid 99 is energized at all times while the gear set is in first, second or reverse gears, and that it is energized when the vehicle is in high gear only below a predetermined vehicle speed with the brush 150 in engagement with the contact 152. In normal high gear driving above the predetermined speed referred to, the brush 150 will be arranged beyond the contact 152 and the circuit to the solenoid thus will be broken except when the button 139 is manually depressed or the button 146 is pulled to close the circuit through the contacts 144 and 147. The latter circuit is utilized for full free wheeling, and will be described in detail later.

The operation of the valves 31 and 32 and the control valve 80 has been described in detail in my copending application Serial No. 704,563 and need be referred to only in a general way. The high point 41 of the cam 38 maintains the valve 31 in its lowermost position while the engine is idling, and opening movement of the throttle rotates the cam 38 in a clockwise direction as viewed in Figures 1 and 2. The movement of the portion of the cam between the points 40 and 41 progressively releases the stem 35 and valve 31 for upward movement until the point 40 of the cam is reached, and the remainder of the cam is concentric whereby it does not affect the position of the valve 31.

When the valve 31 is depressed by rotation of the cam 38 in a counter-clockwise direction upon the releasing of the accelerator for movement to idling position, the port 69 moves downwardly beneath the port 71 while the ports 68 move into registration with the port 70. Communication between the chamber 61 and the atmosphere is thus cut off while the chamber 61 is placed in communication with the intake manifold through the passage 54 and conduit 57, assuming, of course, that the valve 100 is open. As the valve 31 moves downwardly, air is progressively exhausted from the power device and the consequent drop in pressure is communicated to the chamber 47 through the passage 62, thus causing the valve 32 to move downwardly until the valve 31 reaches its lowermost position, whereupon the diaphragm 44 causes the valve 32 to move downwardly until communication is cut off between the ports 68 and 70. At such time the clutch will be completely released by the power device and the ports 70 and 71 will occupy a position with their remote extremities substantially coinciding with the adjacent extremities of the ports 68 and 69.

Assuming that the vehicle is in low gear and at a standstill, the operator then depresses the accelerator to open the throttle and rotate the cam 38 in a clockwise direction, whereupon the high point 41 of the cam will move away from the button 39, thus permitting the spring 36 to move the stem 35 and valve 31 upwardly. The initial movement of the valve 31 moves the port 69 upwardly into partial communication with the port 71 and at the same time the ports 68 will move upwardly definitely beyond the port 70. This action connects the power device to the atmosphere through chamber 61, ports 69 and 71, chamber 74 (see Figure 3) chamber 75, port 76 and ports 105. In this connection it will be noted that the partial vacuum existing in the power device when the clutch is disconnected is communicated to the diaphragm chamber 96 through passage 93, while the lower end of the valve cylinder 104 communicates with the intake manifold through pipe 110. Accordingly the initial releasing of the clutch elements upon the opening of the throttle takes place with the valve 80 in open position and with the valve 106 arranged wholly below the openings 105.

Under the conditions referred to the clutch elements will move toward operative engagement, although atmospheric pressure will not be established in the power device. The admission of air into the power device reduces the pressure differential therein to the point where it is insufficient to overcome the tension of the clutch springs, and the latter accordingly move the clutch elements toward engaging position. This movement is transmitted to the diaphragm 29 of the power device thus rapidly enlarging the capacity of the vacuum side of the power device. It is the latter action which prevents the building up of a pressure in the power device equal to that of the atmosphere and the increase in pressure in the vacuum side of the power device is insufficient to release the diaphragm 44 for upward movement.

The pressure existing in the vacuum side of the power device and in the various piping connections thereto depends on three elements, namely, the area of the diaphragm 29, the rate of movement of such diaphragm and the area of the effective opening of the ports 69 and 71. The relationship of these three factors is disturbed upon initial contact of the clutch elements since the rate of movement of the diaphragm 29 will be reduced. There will be a consequent immediate increase in pressure in the vacuum side of the power device and this increase in pressure will be transmitted to the diaphragm chamber 47 thus reducing the pressure differential on opposite sides of the diaphragm 44 sufficiently to permit the valve 32 to move upwardly and thus move the port 71 out of communication with the port 69.

This action prevents the further rush of air into the power device and thus checks the movement of the clutch elements pending further opening movement of the throttle. If the throttle is opened at the proper rate for low gear, the checking of the clutch elements will take place substantially at the point of initial engagement. There will be no transmission of power through the clutch, therefore, until further movement of the accelerator takes place. The increase in pressure through which upward movement of the valve 32 takes place to check the engagement of the clutch elements is not sufficient to permit the valve 80 to close, and accordingly the entire movement of air into the power device is controlled by the ports 69 and 71.

Upon further opening movement of the throttle, the valve 31 moves upwardly to bring the port 69 into partial communication with the port 71, the rate of communication depending upon the speed of movement of the accelerator and the consequent rate of movement of the valve 31. As the accelerator is moved slowly the vehicle engine will accelerate to a corresponding degree, and air will be admitted into the power device through ports 69 and 71 at a correspondingly slow rate. More rapid acceleration of the vehicle results in more rapid clutch engagement after the checking of the clutch elements has taken place, and accordingly it will be apparent that the operation of the throttle causes and controls operative engagement of the clutch elements.

After the vehicle has attained proper momentum in low gear, the accelerator is released, thus releasing the clutch elements in the manner stated, whereupon the gear shift lever is moved into intermediate gear position. The operation previously described can take place upon the depression of the accelerator. It is the usual practice to open the throttle more rapidly in second gear than in low gear, and to effect more rapid engagement of the clutch elements, this operation being possible due to the fact that the vehicle has gathered substantial momentum. With the present apparatus the engagement of the clutch takes place in the same manner as when the vehicle is in low gear except that the more rapid opening of the throttle causes the valve 31 to assume a slightly higher position when the checking of the clutch elements takes place. Accordingly such checking action takes place slightly later as is desirable. The same operation takes place when the gear-shift lever is moved into high gear position except that the checking of the clutch plates takes place slightly later than in second gear if the accelerator is opened more rapidly as is the usual practice.

When the device is operating automatically, through depression of the accelerator pedal in accordance with the usual skillful conventional operation, the valve 80 remains open throughout the engagement of the clutch in each gear, the valve 80 closing only after full clutch engagement has taken place at which time a pressure substantially equal to that of the atmosphere exists in the chamber 61 and consequently in the chamber 96. Accordingly the proper operation of the accelerator in gear shifting does not cause the valve 80 to operate for the performance of any function. In changing gears however, the operator may carelessly depress the accelerator too suddenly and to too great an extent to permit proper clutch engagement, and the valve 80 comes into operation under such conditions to prevent the jerking of the vehicle incident to the too rapid movement of the clutch elements into operative engagement. In other words, without the valve 80, the sudden and substantial opening movement of the throttle would permit air to flow too rapidly into the power device, thus substantially releasing the clutch elements for complete movement into operative engagement.

The sudden opening movement of the throttle in the manner described substantially reduces the vacuum in the chamber 61 and this reduction in vacuum is immediately communicated to the diaphragm chamber 96, thus reducing the pressure differential on opposite sides of the diaphragm 84 whereupon the spring 88 moves the valve 80 to closed position. Thus communication between the power device and the atmosphere through ports 76 and 105 will be cut off and the flow of air into the power device will be restricted by the port 77. The initial rush of air into the power device incident to the sudden and substantial opening of the throttle, releases the clutch elements for movement toward engaged position, but the closing of the valve 80 acts as a check to prevent the clutch elements from moving rapidly into engagement with each other. Thus any jerking of the vehicle incident to the sudden and substantial opening of the throttle is prevented.

The foregoing description covers the various operations incident to shifting gears except for the operation of releasing the clutch elements upon the releasing of the accelerator pedal. In prior constructions, the releasing of the accelerator pedal has effected the releasing of the clutch elements, but no operation took place until the accelerator pedal was completely released. Accordingly deceleration of the engine would occur prior to the releasing of the clutch, thus causing the engine to act as a brake and cause the vehicle to drag at each releasing of the clutch elements. The present device overcomes such difficulty since at each partial releasing of the accelerator to move the cam from the concentric portion thereof to the inclined portion, downward movement will be transmitted to the valve 31 to connect the power device to the intake manifold and thus establish a pressure differential in the power device. This pressure differential is transmitted to the diaphragm chamber 47 to move the valve 32 downwardly to an extent corresponding to the extent of movement of the valve 31, whereupon further communication between the power device and the intake manifold will be cut off. Further movement of the throttle toward closed position operates in the same manner, and thus it will be apparent that throughout the latter portion of the movement of the throttle toward idling position, the clutch plate pressure will be progressively reduced thus permitting the clutch elements to be completely released instantly when the accelerator reaches full idle position. In actual practice it has been found that this releasing of the clutch plate pressure takes place in proportion to the engine torque and accordingly no slippage of the clutch occurs during normal driving when the inclined portion of the cam holds the valve 31 partially depressed. In this connection it will be noted that the releasing of the clutch plate pressure does not take place in accordance with engine speed, but in accordance with throttle position. For a given engine speed, the throttle position differs in accordance with torque loads, and with the vehicle running under a light load at a given low engine speed, the clutch plate pressure will be partially released, while under conditions wherein the engine is rotating at the same speed under heavy load conditions, the throttle will be opened to a substantially greater extent and there will be no releasing of the clutch plate pressure. Thus it will be apparent that a much more rapid releasing of the clutch elements takes place with the present construction than in prior constructions, thus preventing the jerking of the vehicle at each releasing of the accelerator, and this is important both in gear shifting, and in free wheeling, as will be apparent.

The majority of motor vehicle drivers prefer to utilize the vehicle engine as a brake to decelerate vehicle speed when the accelerator is released instead of having to depend wholly upon the vehicle brakes as is true with the systems of so-called "free wheeling". This is particularly true in city driving in which it is so often necessary to retard vehicle speed. The present apparatus provides means for accomplishing the desired result while at the same time permitting the operator to free wheel in high gear if he so desires. When the switch 144 is open the clutch will not be released when the vehicle accelerator is released except when the vehicle speed drops to a determined point, for example, eight miles per hour. When the switch 144 is closed, however, the clutch will be released whenever the accelerator is released, as will become apparent.

As previously stated, the switch 131, associated with the gear set, remains closed at all times except when the vehicle is in high gear, and accordingly when the vehicle is in first, second or reverse gears, the solenoid 99 will remain constantly energized to hold the solenoid valve 100 in open position. Declutching accordingly will take place under such conditions whenever the accelerator is released since the power device will be controlled solely by the valves 31 and 32. When the vehicle is in high gear, the shift rod 137 holds the switch 131 in open position, thus breaking the circuit through the solenoid 99 except as this circuit may be otherwise closed. With the vehicle traveling in high gear above the predetermined speed referred to, the brush 50 will be out of engagement with the contact 152 and the solenoid 99 will be deenergized and the valve 100 closed. The releasing of the accelerator under such conditions does not affect the clutch since the power device cannot be connected to the intake manifold regardless of the position of the valves 31 and 32. When the vehicle speed has been retarded to the predetermined point referred to, the brush 150 engages the contact 152 thus energizing the solenoid 99 and opening the valve 100. If the accelerator is then released, declutching obviously will take place through the operation of the valves 31 and 32.

If the operator desires to shift from high to intermediate gear without awaiting the necessary retarding of the vehicle to cause this operation to take place automatically, for example, when it is desired to shift gears while ascending a steep incline without losing vehicle momentum, the operator may depress the button 139 and release the accelerator, whereupon declutching will take place. The depressing of the button 139 closes a circuit in parallel with the gear set switch 131, thus opening the solenoid valve 100 whereupon the releasing of the accelerator pedal affords communication between the power device and the intake manifold in the manner previously stated. The button 139 then may be released and the accelerator depressed to engage the clutch elements in the manner previously described.

As previously stated, the present invention is particularly advantageous for use as a full free wheeling unit. The valve mechanism forming the subject matter of my copending application Serial No. 704,563 operates as previously described to permit instantaneous releasing of the clutch upon the releasing of the accelerator pedal. In prior clutch control constructions, two distinct faults have been found in the devices when used as free wheeling units. In the first place, a dragging of the vehicle would occur at each releasing of the accelerator pedal due to the fact that substantial engine deceleration would take place prior to the releasing of the clutch. The present valve mechanism overcomes this disadvantage for the reason described. The second disadvantage of using prior clutch control devices as free wheeling units lies in the difficulty of causing engine acceleration to take place to a point corresponding to vehicle speed prior to the complete engagement of the clutch elements. The result of such operation is that positive clutch engagement takes place before the engine speed has been sufficiently accelerated, and thus a jerking or dragging of the vehicle occurs. The device forming the subject matter of the present invention is particularly directed toward the elimination of the difficulty just referred to.

The device forming the subject matter of my copending application Serial No. 704,563 previously referred to, is particularly advantageous as a free wheeling unit over prior devices for the reason that it completely eliminates the first disadvantage referred to above, namely, in that it permits declutching instantaneously upon the releasing of the accelerator to prevent the jerking of the vehicle. Moreover, it operates to provide smooth reengagement of the clutch when coming out of free wheeling under most conditions. In other words, the device operates to accelerate the engine to a speed corresponding to vehicle speed before final clutch engagement takes place except during one range of vehicle speeds, and in such speeds, clutch reengagement takes place much more smoothly than is possible with prior constructions. It is desired of course to provide smooth clutch reengagement at all vehicle speeds, and the valve 106 and associated parts accomplish the desired results.

As previously stated, the valves 31 and 32 control clutch reengagement except under the condition wherein the accelerator pedal is depressed suddenly and to a substantial extent. Under the latter condition, the valve 80 functions to prevent too rapid clutch engagement. The combination of these two mechanisms operates perfectly for all gear shift purposes. This combination of devices also provides smooth clutch reengagement except during the intermediate range of vehicle speeds referred to. If the operator desires to use the present apparatus as a free wheeling unit, it is merely necessary for him to pull the button 146 to close the switch 144 and move the plunger 112 upwardly to release the valve 106. This operation closes the circuit through the solenoid 99 to hold the valve 100 in open position, the switch 144 completing the circuit through a line connected in parallel to the switch 131, button 139 and brush 150. During the range of accelerator operation in which the valves 31 and 32 control clutch reengagement, a sufficient vacuum is maintained in the bottom of the valve cylinder 104 to hold the valve 106 entirely below the ports 105. Under such conditions the valve 106 does not function and its functioning is wholly unnecessary as will become apparent. During the range of movement of the accelerator during which the valve 80 is closed incident to the sudden and substantial opening of the throttle, the increase in pressure beneath the valve 106 permits it to move upwardly wholly beyond the openings 105. During such time, the valve 80 is closed and the valve 106 obviously can have no effect on the apparatus. The valve 106 operates during the range of movement between the two ranges last described and provides smooth clutch engagement.

When the vehicle is traveling in high gear at speeds up to approximately forty miles per hour, depending upon the nature of the individual vehicle, the operator can release the accelerator and thus free wheel by releasing the clutch, and then may depress the accelerator approximately to the position necessary for accelerating the engine to a speed corresponding to vehicle speed. Under such conditions, that is, the reengaging of the clutch at vehicle speeds up to approximately forty miles per hour, the clutch reengagement will be controlled wholly by the valves 31 and 32, and it has been found that the operation of the accelerator will cause the engine to accelerate to a point corresponding to vehicle speed before positive clutch engagement takes place.

Assuming that the vehicle is traveling at a speed of approximately sixty miles per hour or more, the operator may free wheel by releasing the accelerator, and in order to accelerate the engine speed to a point corresponding to vehicle speed, it will be necessary for him to rapidly open the throttle to a very substantial extent. Such rapid opening movement of the throttle causes a reduction in the vacuum in the diaphragm chamber 96 incident to a similar reduction in vacuum in the chamber 61 and in the power device, and accordingly the valve 80 will close to limit the movement of air into the power device, thus affording ample time for the engine to accelerate to a speed corresponding to vehicle speed before positive clutch engagement takes place.

If the vehicle is traveling in high gear at a speed between the two speed ranges referred to, for example, at fifty miles per hour, the operator readily may free wheel merely by releasing the accelerator, the instantaneous releasing of the clutch elements taking place upon the releasing of the accelerator pedal regardless of vehicle speed. If the operator then rapidly depresses the accelerator pedal to a point necessary to accelerate the engine speed to a point corresponding to vehicle speed, the reduction in vacuum in the chamber 96 will be insufficient to permit the valve 80 to close, and the movement of the valve 31, transmitted by the opening movement of the throttle, will admit air into the power device at a rate which will permit positive clutch engagement to take place slightly prior to the point where engine speed will have reached a point corresponding to the vehicle speed. If the valves 31 and 32 are depended upon to control clutch reengagement under such conditions, there will be a slight dragging of the vehicle which, of course, is undesirable. This dragging action has been found in practice to be materially less serious than in prior constructions, but it is entirely eliminated by the operation of the valve 106.

As previously stated, the valve 106 is arranged wholly beneath the ports 105 during the range of accelerator operation in which the valves 31 and 32 properly control clutch reengagement, that is, for vehicle speeds up to forty miles per hour. Under conditions in which the valve 80 closes due to the reduction in the pressure differential on opposite sides of the diaphragm 84, the valve 106 will be arranged wholly above the ports 105. During the range of accelerator action between the two ranges referred to, the valve 106 "floats" past the ports 105 and minimizes the passage of air therethrough. If free wheeling takes place at a vehicle speed of fifty miles per hour, as suggested above, the depression of the accelerator pedal to effect clutch reengagement operates the valves 31 and 32 with respect to each other to admit air into the power device, and under such conditions the valve 80 will be open. In the absence of the valve 106, air would flow into the power device as rapidly as the valves 31 and 32 would permit, which would be slightly more rapid than is desirable. However, under the conditions referred to, the valve 106 will occupy an intermediate position in which the flow of air from ports 105 to the port 76 will be restricted.

In this connection, it is noted that the valve 106 is provided with a plurality of rather closely arranged relatively narrow annular grooves 107. Each of these grooves is substantially narrower than the ports 105 and it will be apparent that they act to restrict the effective area of the ports 105 under the conditions being considered, and accordingly the valve ports 69 and 71 are prevented from functioning to admit air too rapidly into the power device. Thus clutch reengagement is retarded sufficiently to afford the engine the necessary short interval of time for acceleration to a speed corresponding to vehicle-speed. Thus the present device provides means for preventing complete clutch reengagement from taking place until the engine speed is accelerated to a point corresponding to vehicle speed, and this is true regardless of the vehicle speed at which free wheeling takes place.

The switch 144 and plunger 112 are connected to each other for simultaneous operation as a matter of convenience. The functioning of the valve 106 is unnecessary when the operation of the clutch is taking place for gear shifting, and accordingly it may be held in inoperative position except when full free wheeling is desired. Moreover, the switch 144 is in open position except for full free wheeling, and accordingly the switch 144 and plunger 112 are connected to each other. By pressing the button 146 the switch 144 is opened and the plunger 112 renders the valve 106 inoperative. The pulling of the button 146 closes the switch 144 and causes the plunger 112 to release the valve 106.

From the foregoing it will be apparent that the present apparatus in its entirety takes care of every possible condition of operation of a vehicle clutch. Gear shifting may be readily accomplished without manual operation of the clutch pedal, and clutch engagement at each gear shifting takes place smoothly and without any jerking or lunging of the vehicle. The valves 31 and 32 eliminate the use of separate means for checking the movement of the clutch elements and then bleeding the power device to permit positive clutch engagement since the valves 31 and 32 perform both functions. The operation of the valves referred to for decreasing clutch plate pressure in proportion to engine torque permits the instantaneous releasing of the clutch elements whenever the accelerator is released provided, of course, that the solenoid valve 100 is open. Moreover, the device provides smooth free wheeling by releasing the clutch without any dragging of the vehicle and by preventing positive clutch engagement when coming out of free wheeling, until the engine has had sufficient time to accelerate to a speed corresponding to vehicle speed. The entire valve mechanism is included in a single unit which may be economically manufactured, and once the springs used in the devices have been adjusted, it is never necessary to readjust them. This is true even though the clutch is adjusted to cause initial contact of the clutch plates to take place at different points, since the checking of the clutch plates is taken care of automatically by the valves 31 and 32 regardless of the point at which initial clutch engagement takes place.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. Apparatus of the character described comprising a power device connected to a motor vehicle clutch, means for rendering said power device operative for disengaging the clutch elements and for releasing the clutch elements for movement to operative engagement, means automatically operative for checking the movement of the clutch elements prior to operative engagement thereof when said first named means releases the clutch elements for relatively rapid movement faster than a predetermined rate, and means operative when said first named means releases the clutch elements for movement toward engaged position at a rate slower than said predetermined rate and faster than a predetermined slower rate for checking the movement of the clutch elements prior to operative engagement thereof to an extent less than the checking effected by said second named means.

2. Apparatus of the character described comprising a differential pressure power device connected to a motor vehicle clutch, means for connecting said power device to a source of differential pressure for disengaging the clutch elements and for disconnecting the power device from the source of differential pressure and connecting it to the atmosphere to release the clutch elements for movement into operative engagement, means automatically operative for checking the movement of the clutch elements prior to operative engagement thereof when said first named means releases the clutch elements for relatively rapid movement faster than a predetermined rate, and means operative when said first named means releases the clutch elements for movement toward engaged position at a rate slower than said predetermined rate and faster than a predetermined slower rate for checking the movement of the clutch elements prior to operative engagement thereof to an extent less than the checking effected by said second means.

3. Apparatus of the character described comprising a differential pressure power device connected to a motor vehicle clutch, means for connecting said power device to a source of differential pressure for disengaging the clutch elements and for disconnecting the power device from the source of differential pressure and connecting it to the atmosphere to release the clutch elements for movement into operative engagement, said means including cooperating devices operative for controlling the connection between the power device and the source of differential pressure and the atmosphere for releasing the clutch elements for relatively rapid initial movement and for slower variable movement into operative engagement, means automatically operative for checking the movement of the clutch elements prior to operative engagement thereof when said first named means releases the clutch elements for relatively rapid movement faster than a predetermined rate, and means operative when said first named means releases the clutch elements for movement toward engaged position at a rate slower than said predetermined rate and faster than a predetermined slower rate for checking the movement of the clutch elements prior to operative engagement thereof to an extent less than the checking effected by said second means.

4. Apparatus of the character described comprising a differential pressure power device connected to a motor vehicle clutch, means for connecting said power device to a source of differential pressure for disengaging the clutch elements and for disconnecting the power device from the source of differential pressure and connecting it to the atmosphere to release the clutch elements for movement into operative engagement, said means including cooperating devices operative for controlling the connection between the power device and the source of differential pressure and the atmosphere for releasing the clutch elements for relatively rapid initial movement and for slower variable movement into operative engagement, valve means automatically operative for restricting communication between the power device and the atmosphere to check the movement of the clutch elements prior to operative engagement thereof when said first named means releases the clutch elements for relatively rapid movement faster than a predetermined rate, and means operative when said first named means releases the clutch elements for movement toward engaged position at a rate slower than said predetermined rate and faster than a predetermined slower rate for checking the movement of the clutch elements prior to operative engagement thereof to an extent less than the checking effected by said second named means.

5. Apparatus of the character described comprising a differential pressure power device connected to a motor vehicle clutch, means for connecting said power device to a source of differential pressure for disengaging the clutch elements and for disconnecting the power device from the source of differential pressure and connecting it to the atmosphere to release the clutch elements for movement into operative engagement, said means including cooperating devices operative for controlling the connection between the power device and the source of differential pressure and the atmosphere for releasing the clutch elements for relatively rapid initial movement and for slower variable movement into operative engagement, valve means automatically operative for restricting communication between the power device and the atmosphere to check the movement of the clutch elements prior to operative engagement thereof when said first named means releases the clutch elements for relatively rapid movement faster than a predetermined rate, an automatic valve operative when said first named means releases the clutch elements for movement toward engaged position at a rate slower than said predetermined rate and faster than a predetermined slower rate for restricting communication between the power device and the atmosphere to an extent less than the restriction effected by said valve means for checking the movement of the clutch elements prior to operative engagement thereof.

6. Apparatus of the character described comprising a differential pressure power device connected to a motor vehicle clutch, a pair of cooperating valves one of which is manually operable and the other of which is influenced by said power device, the first named valve of said pair being movable in one direction for connecting the power device to a source of differential pressure and in the other direction for disconnecting the power device from the source of differential pressure and connecting it to the atmosphere, the other valve of said pair being movable in said second named direction out of cooperative relationship with the first named valve of said pair at a point dependent upon the rate of operation of the first named valve of said pair to disconnect the power device from the source of differential pressure and tend to check the movement of the clutch elements toward engaged position, the first named valve of said pair being further movable in said last named direction from its position in cooperative relationship with the other valve of said pair to release the clutch elements for movement into operative engagement, automatic means operative for checking the movement of the clutch elements prior to operative engagement thereof when the first named valve of said pair moves in the last named direction for releasing the clutch elements for relatively rapid movement toward operative engagement faster than a predetermined rate, and means operative when said pair of valves releases the clutch elements for movement toward engaged position at a rate slower than said predetermined rate and faster than a predetermined slower rate for checking the movement of the clutch elements prior to operative engagement thereof to an extent less than the checking effected by said first named means.

7. Apparatus constructed in accordance with claim 6 wherein said automatic means comprises a valve controlling communication between the power device and the atmosphere and movable to closed position when the clutch elements are released for relatively rapid movement toward operative engagement faster than said first named predetermined rate.

8. Apparatus constructed in accordance with claim 6 wherein said automatic means comprises a valve controlling communication between the power device and the atmosphere, and a pressure responsive member connected to said last named valve and responsive to differential pressures in said power device whereby said last named valve automatically closes when the differential pressure in said power device is reduced to a point at which the clutch elements are released for movement toward operative engagement faster than said first named predetermined rate.

9. Apparatus constructed in accordance with claim 6 wherein said last named means comprises an automatic valve movable to operative position to restrict communication between the power device and the atmosphere and movable to said operative position when the power device releases the clutch elements for movement toward engaged position at a rate slower than said first named predetermined rate and faster than said predetermined slower rate.

10. Clutch operating mechanism for motor vehicles comprising a power device connected to the vehicle clutch, control means operative upon movement of the throttle of the vehicle engine to idling position for rendering the power device operative for disengaging the clutch, said control means being operative upon movement of the throttle toward open position for releasing the clutch elements for movement toward operative engagement at a rate dependent upon the rate and extent of opening movement of the throttle, automatic means for checking the movement of the clutch elements prior to operative engagement thereof when said control means releases the clutch elements for movement toward engaged position at a rate faster than a predetermined rate, and means operative when said control means releases the clutch elements for movement toward engaged position at a rate slower than said predetermined rate and faster than a predetermined slower rate for checking the movement of the clutch elements prior to operative engagement thereof to an extent less than the checking effected by said second named means.

11. Clutch operating mechanism for motor vehicles comprising a power device connected to the vehicle clutch, control means operative upon movement of the vehicle engine throttle to idling position for rendering the power device operative for disengaging the clutch, said control means being operative upon movement of the throttle toward open position for successively releasing the clutch elements, checking the movement of the clutch elements prior to operative engagement thereof, and then further releasing the clutch elements for movement into operative engagement, said control means being operative for checking the movement of the clutch elements at progressively later points in accordance with the progressively more rapid and extensive opening movement of the engine throttle, automatic means for checking the movement of the clutch elements at a predetermined point prior to final engagement thereof if the rate and extent of throttle opening is such as to render said control means inoperative for checking the movement of the clutch elements at least as early as such predetermined point, and automatic means for checking the movement of the clutch elements to an extent less than the checking effected by said first named automatic means if said control means tends to check the movement of the clutch elements at a point earlier than said predetermined point and later than a predetermined earlier point.

12. Clutch operating mechanism for motor vehicles comprising a power device connected to the vehicle clutch, control means operative upon movement of the vehicle engine throttle to idling position for rendering the power device operative for disengaging the clutch, said control means being operative upon movement of the throttle toward open position for successively releasing the clutch elements, checking the movement of the clutch elements prior to operative engagement thereof, and then further releasing the clutch elements for movement into operative engagement, said control means being operative for checking the movement of the clutch elements at progressively later points in accordance with the progressively more rapid and extensive opening movement of the engine throttle, automatic means controlled by the degree to which the power device releases the clutch elements for movement toward operative engagement and operative for checking the movement of the clutch elements at a predetermined point prior to final engagement thereof if said control means fails to check the movement of the clutch elements at least as early as such predetermined point, and automatic means rendered operative by said control means to check the clutch elements to an extent less than the checking effected by said first named automatic means if said control means tends to check the movement of the clutch elements at a point earlier than said predetermined point and later than a predetermined earlier point.

13. Clutch operating mechanisms for motor vehicles comprising a differential pressure power device connected to the vehicle clutch, control valve means operative upon movement of the engine throttle to idling position for connecting the power device to a source of differential pressure to disengage the clutch, said control valve means being operative upon movement of the throttle toward open position for controlling communication between the power device and the atmosphere and between the power device and the source of differential pressure for successively releasing the clutch elements, checking the movement of the clutch elements at a point prior to operative engagement thereof, and then further releasing the clutch elements for movement into operative engagement, said control valve means being operative for checking the movement of the clutch elements at progressively later points in accordance with the progressively more rapid and extensive opening movement of the engine throttle, an automatic valve for controlling communication between the power device and the atmosphere for checking the movement of the clutch elements at a predetermined point prior to final engagement thereof if the rate and extent of throttle opening is such as to render said control means inoperative for checking the movement of the clutch elements at least as early as such predetermined point, and a second automatic valve operative for checking the movement of the clutch elements to an extent less than the checking effected by said first named automatic valve if said control means tends to check the movement of the clutch elements at a point earlier than said predetermined point and later than a predetermined earlier point.

14. Clutch operating mechanisms for motor vehicles comprising a differential pressure power device connected to the vehicle clutch, control valve means operative upon movement of the engine throttle to idling position for connecting the power device to a source of differential pressure to disengage the clutch, said control valve means being operative upon movement of the throttle toward open position for controlling communication between the power device and the atmosphere and between the power device and the source of differential pressure for successively releasing the clutch elements, checking the movement of the clutch elements at a point prior to operative engagement thereof, and then further releasing the clutch elements for movement into operative engagement, said control valve means being operative for checking the movement of the clutch elements at progressively later points in accordance with the progressively more rapid and extensive opening movement of the engine throttle, an atmospheric conduit controlled by said control valve means for determining the degree of communication between the power device and the atmosphere, an automatic valve in said conduit between said control valve means and the atmosphere and operative for restricting the flow of air through said conduit to check the movement of the clutch elements at a predetermined point prior to final engagement thereof if the rate and extent of throttle opening is such as to render said control means inoperative for checking the movement of the clutch elements at least as early as such predetermined point, and a second automatic valve controlling said conduit between said first named automatic valve and the atmosphere and operative for restricting the flow of air through said conduit to check the movement of the clutch elements to an extent less than the checking effected by said first named automatic valve if said control valve means tends to check the movement of the clutch elements at a point earlier than said predetermined point and later than a predetermined earlier point.

15. Clutch operating mechanism for motor vehicles comprising a differential pressure power device connected to the vehicle clutch, a valve casing having ports connected respectively to the power device, the intake manifold of the motor vehicle engine and the atmosphere, a pair of valves in said casing, means connecting one of said valves to the engine throttle to move such valve in one direction upon closing movement of the throttle and in the other direction upon opening movement of the throttle, means for causing movement of the other valve in said first named direction upon actuation of the power device and in the second named direction upon the releasing thereof, said valves being provided with cooperating ports operative for establishing communication between the power device and the intake manifold upon movement of the first named valve in the first named direction and for connecting the power device to the atmosphere upon movement of the second named valve in the second named direction, an automatic valve restricting the flow of air through said atmospheric port to check the movement of the clutch elements at a point prior to operative engagement thereof if said pair of valves operate to admit air to the power device at a rate faster than a predetermined rate, and a second automatic valve for restricting the flow of air through said atmospheric port to a less extent than said first named automatic valve to check the movement of the clutch elements at a point prior to said predetermined point when said pair of valves operate to admit air at a rate slower than said predetermined rate and faster than a predetermined slower rate.

16. Clutch operating mechanism for motor vehicles comprising a differential pressure device connected to the vehicle clutch, a valve casing having ports communicating respectively with the power device, the intake manifold of the vehicle engine and the atmosphere, a pair of valves in sliding engagement with each other in said casing and each provided with a pair of ports, the remote extremities of the ports of one valve being spaced apart at least as far as the adjacent extremities of the ports of the other valve, one of said valves being connected to the engine throttle to be moved in one direction upon the closing thereof and in the other direction upon the opening thereof, a pressure chamber having a pressure responsive member therein connected to the other valve and communicating with the power device to be influenced by pressures therein whereby such valve is movable in the first named direction upon the actuation of the power device and in the second named direction upon the admission of air into the power device to release the clutch elements for movement toward operative engagement, said second named valve being movable in the second named direction to disconnect the power device from the atmosphere through said first named valve at a point prior to operative engagement of the clutch elements depending upon the rate and extent of opening movement of the throttle, automatic means for restricting communication through said atmospheric port to check the movement of the clutch elements at a predetermined point prior to final engagement thereof if said pair of valves fail to check the movement of the clutch elements at least as early as such predetermined point, and automatic means for checking the movement of the clutch elements to an extent less than the checking effected by said first named automatic means if said pair of valves tend to check the movement of the clutch elements at a point earlier than said predetermined point and later than a predetermined earlier point.

17. Apparatus constructed in accordance with claim 16 wherein said last named automatic means comprises a valve operative for restricting the passage of air through said atmospheric port, and means for rendering said last named valve operative upon a decrease in the partial vacuum in the intake manifold of the vehicle engine to a point within a predetermined range of pressures.

18. Apparatus constructed in accordance with claim 16 provided with an atmospheric conduit connected to said atmospheric port, said first named automatic means comprising a valve arranged in said conduit, said second named automatic means comprising a valve controlling said conduit between said last mentioned valve and the atmosphere, a pressure chamber, means for connecting said pressure chamber to the intake manifold, and spring means urging said last named valve in one direction, said last named valve being influenced by pressures in said pressure chamber to be moved to operative position to restrict the flow of air through said conduit when the partial vacuum in the intake manifold of the vehicle engine drops to a point within a predetermined range of pressures.

19. Apparatus constructed in accordance with claim 16 provided with an atmospheric conduit connected at one end to said atmospheric port, said last named automatic means comprising a cylindrical valve having grooves therein and movable across said conduit to cause said grooves to restrict the passage of air through said conduit, a pressure cylinder in which said last named valve is slidable, a spring urging said last named valve in one direction, and a conduit connecting said pressure cylinder to the intake manifold to be influenced by pressures therein whereby said last named valve moves across said atmospheric conduit when the partial vacuum in the intake manifold drops to a point within a predetermined range of pressures.

EDWARD G. HILL.